United States Patent
Tayeb et al.

(10) Patent No.: US 11,900,365 B1
(45) Date of Patent: Feb. 13, 2024

(54) PREDICTING ATTRIBUTES FOR RECIPIENTS

(71) Applicant: INTUIT INC., Mountain View, CA (US)

(72) Inventors: Yaakov Tayeb, Tzur Hadassa (IL); Hadar Lackritz, Tel-Aviv (IL)

(73) Assignee: Intuit, Inc., Mountain View, CA (US)

( * ) Notice: Subject to any disclaimer, the term of this patent is extended or adjusted under 35 U.S.C. 154(b) by 0 days.

(21) Appl. No.: 18/049,846

(22) Filed: Oct. 26, 2022

(51) Int. Cl.
*G06Q 20/38* (2012.01)

(52) U.S. Cl.
CPC .................... *G06Q 20/38* (2013.01)

(58) Field of Classification Search
CPC .................................................. G06Q 20/38
USPC ......................................................... 705/39
See application file for complete search history.

(56) References Cited

U.S. PATENT DOCUMENTS

2022/0036210 A1* 2/2022 Sanghvi ............. G06Q 30/0203
2022/0198581 A1* 6/2022 Rusu .................... G06F 40/284

FOREIGN PATENT DOCUMENTS

JP         2021103339 A  *  7/2021  ......... G06F 16/2379

OTHER PUBLICATIONS

"Machine Learning: Algorithms, Real-World Applications and Research Directions," by Iqbal H. Sarker. SN Computer Science 2, No. 3 (2021): 160. pp. 1-21. (Year: 2021).*

* cited by examiner

*Primary Examiner* — Sara C Hamilton
(74) *Attorney, Agent, or Firm* — Patterson & Sheridan, LLP (57) ABSTRACT

The present disclosure provides techniques for recommending vendors using machine learning models. One example method includes receiving electronic transaction data indicative of one or more transactions, identifying, from the one or more transactions, a subset of transactions that are associated with for known attribute values with respect to one or more unique recipients, computing, for each unique provider of the one or more unique providers, a provider feature based on the known attribute values with respect to a subset of the one or more associated unique recipients, computing, for a given recipient indicated in one or more given transactions that are not included in the subset of transactions, a recipient feature based on the provider feature of each unique provider of the one or more associated unique providers, and predicting, based on the recipient feature, a value for the attribute with respect to the given recipient.

18 Claims, 5 Drawing Sheets

PREDICTING ATTRIBUTES FOR RECIPIENTS

INTRODUCTION

Aspects of the present disclosure relate to predicting attributes for recipients.

Electronic transactions have become increasingly popular, especially business-to-business (B2B) transactions, and particularly as more and more businesses utilize online exchange platforms or online payment services. Under a B2B scheme, a transaction can indicate a provider (e.g., of goods or services) and a recipient (e.g., of the goods or services). In many cases, electronic transactions are completed not directly by a provider or a recipient, but with the help of some third party (e.g., a financial institution affiliated with a recipient, such as a bank).

B2B electronic transactions usually do not specify some attributes for the recipients. Those attributes can indicate characteristics of a recipient and can be helpful for a provider, for example, to more effectively plan based on the recipient attributes so as to deliver goods or services to several recipients in a satisfactory manner.

However, usually the B2B electronic transactions do not include enough information to help determine attributes of recipients. In many cases, unless a recipient declares its own attributes, a provider has little knowledge of the attributes of the recipient, which can reduce the efficiency of the provider in delivering goods and services. There are not currently any effective techniques for reliably overcoming this deficiency in electronic transactions.

Accordingly, improved systems and methods are needed for determining attributes for recipients associated with electronic transactions.

BRIEF SUMMARY

Certain embodiments provide a method for predicting attributes for recipients. The method generally includes receiving electronic transaction data indicative of one or more transactions, wherein the one or more transactions are associated with one or more unique providers, and wherein each transaction of the one or more transactions indicates a recipient and one unique provider, identifying, from the one or more transactions, a subset of transactions that are associated with known values for an attribute with respect to one or more unique recipients, and wherein each transaction of the subset of transactions indicates one unique provider and one unique recipient, computing, for each unique provider of the one or more unique providers, a provider feature based on the known values for the attribute with respect to a subset of the one or more unique recipients associated with the unique provider in the subset of transactions, computing, for a given recipient indicated in one or more given transactions of the one or more transactions that are not included in the subset of transactions, a recipient feature based on the provider feature of each unique provider of the one or more unique providers that is indicated in the one or more given transactions, and predicting, based on the recipient feature, a value for the attribute with respect to the given recipient.

Another embodiment provides a system for predicting attributes for recipients. The system generally includes a memory including computer-executable instructions and a processor configured to execute the computer-executable instructions. Executing the computer executable-instructions causes the system to receive electronic transaction data indicative of one or more transactions, wherein the one or more transactions are associated with one or more unique providers, and wherein each transaction of the one or more transactions indicates a recipient and one unique provider, identify, from the one or more transactions, a subset of transactions that are associated with known values for an attribute with respect to one or more unique recipients, and wherein each transaction of the subset of transactions indicates one unique provider and one unique recipient, compute, for each unique provider of the one or more unique providers, a provider feature based on the known values for the attribute with respect to a subset of the one or more unique recipients associated with the unique provider in the subset of transactions, compute, for a given recipient indicated in one or more given transactions of the one or more transactions that are not included in the subset of transactions, a recipient feature based on the provider feature of each unique provider of the one or more unique providers that is indicated in the one or more given transactions, and predict, based on the recipient feature, a value for the attribute with respect to the given recipient.

Still another embodiment provides a non-transitory computer readable medium for predicting attributes for recipients. The non-transitory computer readable medium generally includes instructions to be executed in a computer system, wherein the instructions when executed in the computer system perform a method for predicting attributes for recipients on a computing device requiring minimal run time processing. The method generally includes receiving electronic transaction data indicative of one or more transactions, wherein the one or more transactions are associated with one or more unique providers, and wherein each transaction of the one or more transactions indicates a recipient and one unique provider, identifying, from the one or more transactions, a subset of transactions that are associated with known values for an attribute with respect to one or more unique recipients, and wherein each transaction of the subset of transactions indicates one unique provider and one unique recipient, computing, for each unique provider of the one or more unique providers, a provider feature based on the known values for the attribute with respect to a subset of the one or more unique recipients associated with the unique provider in the subset of transactions, computing, for a given recipient indicated in one or more given transactions of the one or more transactions that are not included in the subset of transactions, a recipient feature based on the provider feature of each unique provider of the one or more unique providers that is indicated in the one or more given transactions, and predicting, based on the recipient feature, a value for the attribute with respect to the given recipient.

The following description and the related drawings set forth in detail certain illustrative features of the various embodiments.

BRIEF DESCRIPTION OF DRAWINGS

The appended figures depict certain features of the various aspects described herein and are not to be considered limiting of the scope of this disclosure.

DETAILED DESCRIPTION

Aspects of the present disclosure provide apparatuses, methods, processing systems, and computer-readable mediums for predicting attributes for recipients.

In a B2B environment, a provider (e.g., of goods or services) usually has little knowledge of the attributes of the recipient (of the goods or services) from B2B electronic transactions. For example, electronic transaction records generally include limited or no information about recipients and, thus, software applications that provide functionality related to electronic transaction records are limited by this lack of recipient information in the electronic transaction records. Embodiments of the present disclosure address these deficiencies in electronic transaction records and resulting limitations in software applications by utilizing historical transaction data that includes other recipients with known attribute values for predicting unknown attribute values for recipients that cannot be easily deduced from the B2B electronic transaction records.

An attribute can represent a characteristic of a recipient. For example, an attribute can be the industry of the recipient. An attribute value can specify information about the attribute of the recipient. For example, the attribute can be the industry of the recipient. Following the example, an attribute value can be a string "Food" specifying that the recipient is from the food industry, or an index value associated with the food industry. Some other attributes can include a number of invoices, an average transaction amount of the invoices, and/or the like. For simplicity, in the following discussion, an industry is used as an example of an attribute, and the attribute value is discussed with respect to the example of an index value indicating an industry. However, these examples are non-limiting, and other types of attributes and attribute values may be utilized with techniques described herein.

In some aspects, as described in more detail below with respect to FIG. 1, an attribute value of a recipient is predicted based on an interaction (e.g., transaction) history between particular providers and particular other recipients and the known attribute values of those particular other recipients. The recipient whose attribute is to be predicted should be in a transaction with one or more providers indicated in the interaction history. The interaction history can include historical transactions between providers and recipients with known attribute values. The historical transactions are also known as labeled data, where the labels are the known attribute values of the recipients. Providers in the labeled data are regarded as known providers. Conversely, transactions that indicate recipients with unknown attribute values but with known providers are known as unlabeled data.

Each of the providers in labeled data can be assigned a provider feature, as described in more detail below with respect to FIG. 2. The provider feature can be computed using the known attribute values of recipients associated with (e.g., in a transaction of labeled data with) the provider. For example, a set of recipients that have been involved in transactions with the provider in the labeled data can be determined. In some aspects, the set of recipients include unique recipients, such that the known attribute value of a recipient in multiple transactions in the labeled data with the provider is used only once in the computation. The frequencies of distinct known attribute values of the unique recipients can be determined. For example, if the provider is only associated with two unique recipients in the labeled data, where one unique recipient has an attribute value of 1 and the other unique recipient has an attribute value of 2, the frequency of 1 is 1 and the frequency of 2 is 1. In some aspects, the frequencies are normalized to represent a set of probabilities that the provider will interact with (e.g., in a transaction with) the recipients with known attribute values. The normalized frequencies can be the provider features.

Similarly, a recipient can be assigned a recipient feature, regardless of whether the attribute of the recipient is known, as described in more detail below with respect to FIG. 3. In some aspects, the recipient is associated with one or more unique known providers in labeled data, where the provider features of the one or more unique known providers are combined (e.g., summed) and normalized to generate the recipient feature, whereas, similar to computing a provider feature, a provider feature of a provider in multiple transactions in the labeled data with the recipient is used only once during the computation. In some aspects, a recipient is associated with some unknown providers (e.g., providers not in labeled data), and the unknown providers are excluded from the recipient feature calculation, as there are only null provider features for the unknown providers. In some aspects, a recipient is associated with only unknown providers, and it is not possible to compute a recipient feature until the recipient interacts (e.g., in a transaction) with a known provider.

In some aspects, a recipient feature of a recipient can be used to predict the attribute value of the recipient, if the attribute value of the recipient is unknown, using a predictive model. For example, the predictive model can be a rule-based decision tree, or a machine learning model that includes a logistic regression model, a random forest model, a decision tree, a gradient-boosted tree, a neural network, and/or the like, depending on the attribute. For example, in the case of a categorical attribute (e.g., the "industry" attribute) the predictive model may include one or more classification models, whereas in the case of a numerical attribute (e.g., the "number of invoices" attribute) the predictive model may include one or more regression models.

In some cases it may be expected that similar recipients interact with a similar set of providers. By studying the similarities and discovering the structures implied in the similarities using the provider features and the recipient features, the attribute for a recipient can be successfully predicted based on similar recipients, even if there is little information about the attribute for the recipient.

Accordingly, an attribute for a recipient can be accurately predicted based on which unique providers the recipient has interacted with, and without any information for the attribute itself. Predicting attributes for recipients can facilitate exchange between a provider and the recipients by helping the provider to manage expectations, plan better, and improve efficiency in delivering goods or services to the recipients. For example, predicted attribute values can be provided as inputs to a downstream prediction model (e.g., a rule-based model or a machine learning model) to predict information about future transactions, such as an amount of a future transaction, a delay in payment, and/or the like.

By utilizing electronic transaction data of recipients other than a recipient for whom an attribute value is being predicted to automatically predict the recipient attribute value for the recipient, techniques described herein overcome deficiencies in existing techniques for computer-based analysis of electronic transaction records that are based only on the data in the electronic transaction records themselves, and leverage machine learning techniques in certain embodiments to produce electronic information that would not otherwise be available. Thus, embodiments of the present disclosure provide a technical improvement with respect to conventional techniques for analyzing electronic transaction records, and improve the functionality of computing applications by generating useful information that could not otherwise be generated.

Example Predictive System for Predicting Attributes for Recipients

Figure 1:
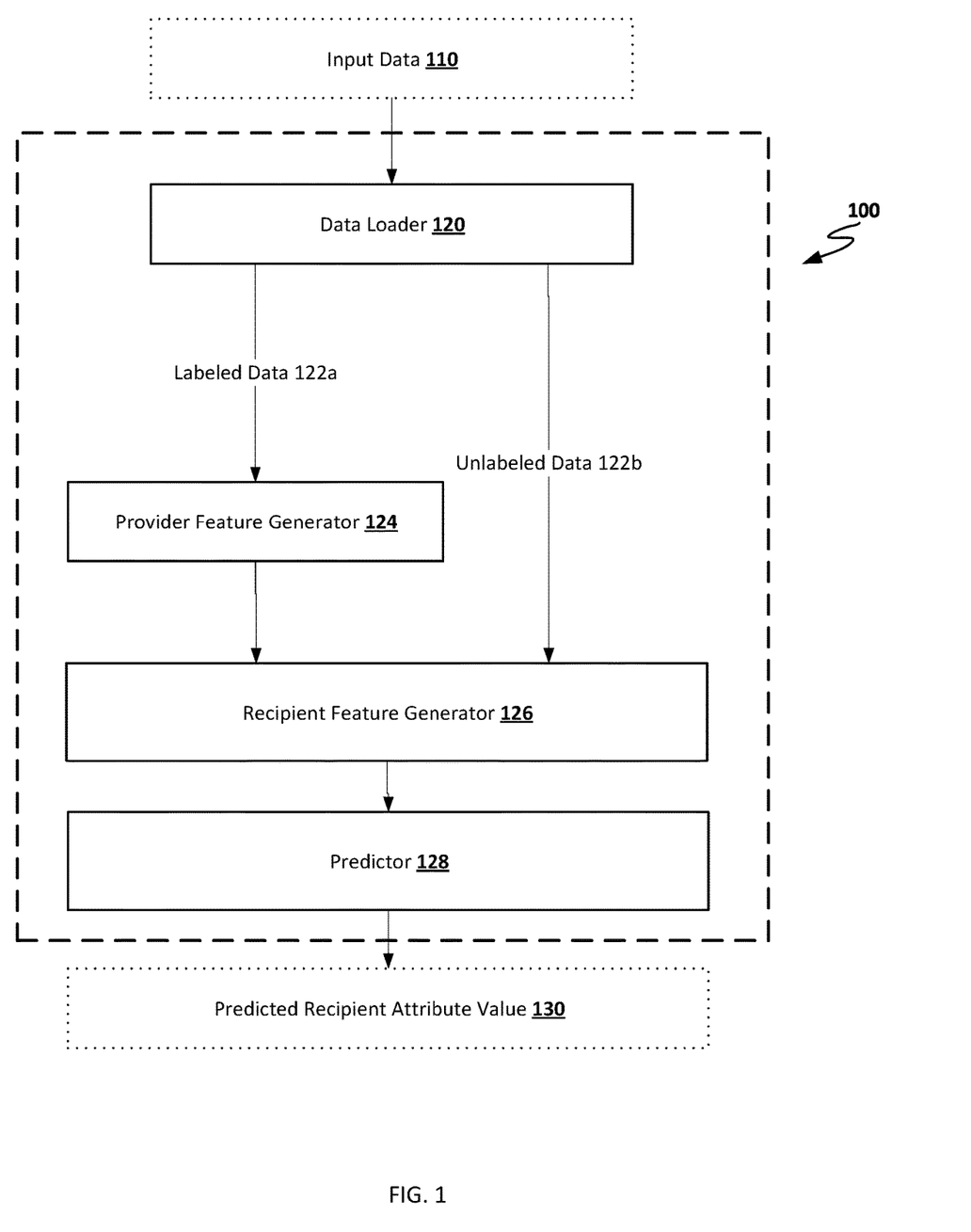
FIG. 1 depicts an example predictive system for predicting attributes for recipients.

FIG. 1 depicts an example predictive system 100 for predicting attributes for recipients. Predictive system 100 can receive input data 110 as inputs and generate predicted recipient attribute value 130 as the output. Input data 110 can be electronic data.

Input data 110 can indicate one or more transactions, such as in the form of electronic transaction records. The one or more transactions can be associated with one or more unique providers (e.g., of particular goods or services), whereas each transaction of the one or more transactions can indicate a recipient and one unique provider. For example, the unique providers can be known and accessible, and input data 110 can be obtained from the unique providers.

Input data 110 can be provided as inputs to data loader 120. Data loader 120 can separate input data 110 into labeled data 122a and unlabeled data 122b. Labeled data 122a can be a subset of transactions that are associated with known values for an attribute with respect to one or more unique recipients. Accordingly, unlabeled data 122b can be a subset of transactions that are associated with unknown values for the attribute with respect to the one or more unique recipients. Each transaction in labeled data 122a or unlabeled data 122b can indicate one unique provider and one unique recipient. In some examples, the unique providers in unlabeled data 122b are also in labeled data 122a, such that the unique providers in unlabeled data 122b are a subset of the unique providers in unlabeled data 122a.

The attribute of a recipient can indicate characteristics of the recipient, whereas the attribute value can specify information related to the characteristics. In some examples, the attribute is the industry of the unique recipients, and the known attribute values indicate the respective industries of the unique recipients (e.g., via indices), such as electronics, transportation, food, and the like. The known attribute values can be provided (e.g., via self-declaration) by the unique recipients in labeled data 122a. For simplicity, as discussed above, the attribute is regarded as the industry whereas the attribute value is regarded as the index value indicating an industry in the following discussion.

Labeled data 122a can be processed to train or construct predictor 128 discussed below, whereas attribute values for the unique recipients in unlabeled data 122b can be predicted using predictor 128.

Labeled data 122a can be provided as inputs to provider feature generator 124 to compute provider features for the one or more unique providers. Provider feature generator 124 can first aggregate (e.g., using a group-by function) labeled data 122 by the unique providers. For each unique provider, provider feature generator 124 can identify distinct attribute values of the unique recipients in labeled data 112a, and compute the frequencies of each distinct attribute value. Provider feature generator 124 can normalize (e.g., by division), for a unique provider, the frequencies of each distinct attribute value based on a sum of the frequencies. The normalized frequencies can be the provider feature for the unique provider. Usually, the sum of elements of the provider feature is 1.

A provider feature can be regarded as the set of probabilities for a unique provider to interact (e.g., have a transaction) with recipients with different attribute values, and can represent the behavior of the unique provider. For example, following the discussion above in which the attribute is the industry, a unique provider can have a probability of 0.33 to interact with recipients from the food industry and a probability of 0.66 to interact with recipients from the transportation industry. Provider features can be represented using an appropriate data structure, such as lists, vectors, dictionaries, pandas DataFrames, or the like. For simplicity, provider features are represented as vectors in the following discussion. Provider features are further described below with respect to FIG. 2.

Provider features and unlabeled data 122b can be provided as inputs to recipient feature generator 126 to generate recipient features for the recipients in unlabeled data 122b. Recipient feature generator 126 can first identify a set of unique recipients in unlabeled data 122b. For each unique recipient in the set of unique recipients, recipient feature generator 126 can determine a set of associated unique providers, whereas the unique providers are indicated in transactions with the unique recipient in unlabeled data 122b.

Recipient feature generator 126 can obtain provider features for the set of associated unique providers and compute a sum of the provider features. For example, the provider features can be vectors, and the sum of the provider features can be the sum of the provider feature vectors. Recipient feature generator 126 can normalize (e.g., by division) the sum of the provider features to generate the recipient feature, based on a sum of the components of the sum of the provider features. Usually, similar to a provider feature, the sum of elements of a recipient feature is 1.

Following the example above, the sum of the provider features can be a vector (also known as the provider feature sum vector), and the recipient feature can be generated by normalizing the provider feature sum vector based on the sum of the components (e.g., the elements) of the provider feature sum vector. In this example, the recipient feature can also be a vector. Recipient features are further described below with respect to FIG. 3.

In some examples, alternatively or additionally, the recipient features are combined with (e.g., concatenated with) other characteristics of the unique recipients. For example, information about the other characteristics of the unique recipients can be received and processed (e.g., vectorized) before being appended to the recipient feature vectors. Characteristics of the unique recipients can include a number of invoices, an average transaction amount of the invoices, and/or the like.

Recipient features can be represented using an appropriate data structure, such as lists, vectors, dictionaries, pandas DataFrames, or the like. In some examples, the recipient features have the same data structure as the provider features discussed above. For simplicity, recipient features are also represented as vectors in the following discussion.

Recipient features can be provided to predictor 128 to predict the unknown attribute values for the unique recipients in unlabeled data 122b. The predicted attribute value is also known as predicted recipient attribute value 130. In some examples, predictor 128 is a rule-based decision tree. In some examples, additionally or alternatively, predictor 128 is a machine learning model, which can include a logistic regression model, a random forest model, a decision tree, a gradient-boosted tree, or a neural network.

Although the attribute (e.g., the industry) is discussed as a categorical term, numerical attributes can also be predicted. For example, in the case of a categorical attribute (e.g., the "industry" attribute) predictor 128 may include one or more classification models, whereas in the case of a numerical attribute (e.g., the "number of invoices" attribute) predictor 128 may include one or more regression models Predictor 128 can be trained as a machine learning model. For example, recipient features can be generated for the unique recipients in labeled data 122*a* using recipient feature generator 126, similar to the discussion above, and the known attribute values of the unique recipients in labeled data 122*a* can be the labels (e.g., desired outputs) for predictor 128. The recipient features and the known attribute values of the unique recipients in labeled data 122*a* can be used to train predictor 128, such that predictor 128 can predict a known attribute value for a unique recipient in labeled data 122*a*, based on the recipient feature of the unique recipient. In some examples, the recipient features include characteristics discussed above.

In some embodiments predictor 128 is trained via a supervised learning process that involves providing training inputs representing recipient features as inputs to predictor 128. Predictor 128 processes the training inputs through its various layers and outputs predicted attribute values with respect to the recipients represented by the inputs. The predictions are compared to the known labels associated with the training inputs (e.g., known attribute values for the recipients) to determine the accuracy of predictor 128, and predictor 128 is iteratively adjusted until one or more conditions are met. For instance, the one or more conditions may relate to an objective function (e.g., a cost function or loss function) for optimizing one or more variables (e.g., classification accuracy). In some embodiments, the conditions may relate to whether the predictions produced by predictor 128 based on the training inputs match the known labels associated with the training inputs or whether a measure of error between training iterations is not decreasing or not decreasing more than a threshold amount. The conditions may also include whether a training iteration limit has been reached. Parameters adjusted during training may include, for example, hyperparameters, values related to numbers of iterations, weights, functions used by nodes to calculate scores, and the like. In some embodiments, validation and testing are also performed for predictor 128, such as based on validation data and test data, as is known in the art.

Following the example above, the attribute can be the industry of a recipient, and predicted recipient attribute value 130 can indicate an industry for a recipient in unlabeled data 122*b*. In some examples, additionally or alternatively, the attribute is one of a number of invoices, an average transaction amount of the invoices, and/or the like.

As a result, predictor 128 can accurately predict an unknown attribute value for a unique recipient in unlabeled data 112*b*, even though there is little information about the attribute value of the unique recipient.

In some examples, in some transactions, a recipient is associated with some providers not in labeled data 122*a*, and the unknown providers are excluded from the recipient feature computation, as there are only null provider features (e.g., zero vectors) for the unknown providers.

In some examples, predictive system 100 is built to incorporate online evaluation and continuous integration functions. Predictive system 100 can perform online processing of transaction data. For example, a new transaction record indicative of a unique provider and a unique recipient enters predictive system 100, and predictive system 100 subsequently determines (e.g., by data loader 120) whether the new transaction record corresponds to labeled data 122*a* or unlabeled data 122*b*. If the new transaction record corresponds to labeled data 122*a* (e.g., with a known attribute value of the unique recipient), the new transaction record is used to update the labeled data 122*a*, which can be used to update provider features and to retrain predictor 128 (e.g., thereby allowing predictor 128 to be continuously improved). If the new transaction record corresponds to unlabeled data 122*a* (e.g., with an unknown attribute value of the unique recipient), the new transaction record is used by predictor 128 to generate predicted recipient attribute value 130 for the unique recipient. In some examples, predictive system 100 will not predict an attribute value for the unique recipient if the unique provider in the new transaction is new (e.g., without a provider feature in predictive system 100) due to lack of information, and will construct or update the provider feature for the new unique provider based on more transactions associated with the new unique provider and unique recipients with known attribute values (e.g., when such data becomes available) before generating predictions.

In some examples, predicted recipient attribute values are further provided as inputs to a downstream prediction model (e.g., a rule-based model or a machine learning model) to predict information about future transactions, such as an amount of a future transaction, a delay in payment, and/or the like.

Example Process for Provider Feature Generation

Figure 2:
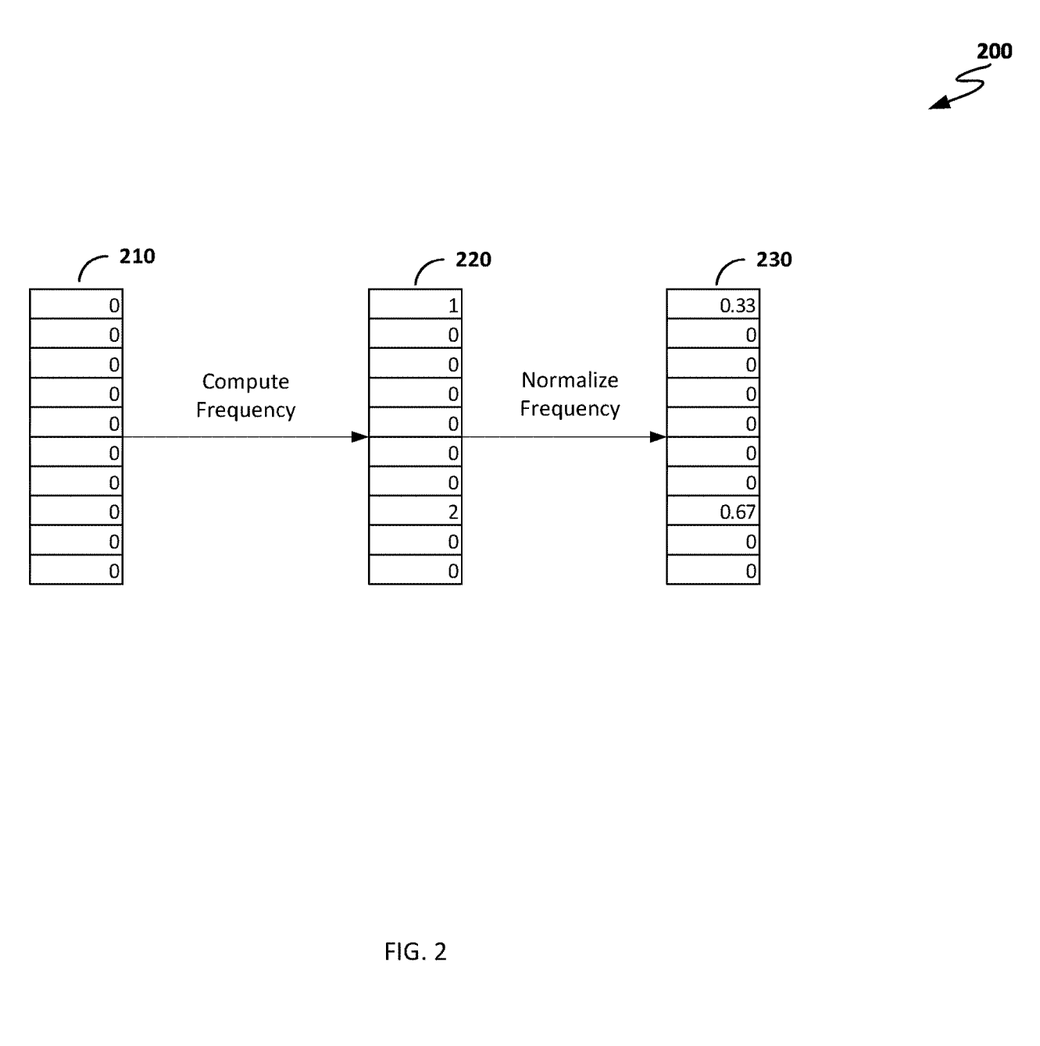
FIG. 2 depicts an example process for provider feature generation for a unique provider.

FIG. 2 depicts an example process 200 for provider feature generation for a unique provider. The provider feature can be generated by provider feature generator 124 as shown in FIG. 1. Process 200 can be carried out by a predictive system, such as predictive system 100 as shown in FIG. 1. Although FIG. 2 depicts provider features as vectors, provider features can be represented in other appropriate data structures, such as lists, dictionaries, pandas DataFrames, or the like. In addition, though the example illustrates vectors of a certain size, process 200 can generate vectors of variable sizes.

Process 200 can start by creating a zero vector (e.g., a vector with all its elements as zeroes) as the provider feature for the unique provider. The size of the vector can be based on the attribute. In this example, there are 10 different possible attribute values, indexed 0 through 9, whereas the indices can indicate different attribute values. Accordingly, the provider feature can be initialized as zero vector 210, with size 10.

Process 200 can then count frequencies of distinct known attribute values of the unique recipients associated with the unique provider in a transaction. In this example, one unique recipient cannot contribute more than once to the frequency of a known attribute value. For example, one unique recipient can be associated with the unique provider in multiple transaction, but the frequency of the known attribute value of unique recipient will increment only once instead of multiple times.

In this example, the attribute is the industry of the unique recipients, and several unique recipients can be associated with the unique provider. Following the example, there are 3 unique recipients associated with the unique provider, whereas one of them is from the industry indexed at 0 (e.g., representing the food industry), whereas the other two of them are from the industry indexed at 7 (e.g., representing the construction industry). Accordingly, the element at index 0 of vector 210 is updated to 1, and the element at index 7 of vector 210 to 2, so as to generate vector 220

Process 200 can further normalize the frequencies based on a sum of the frequencies. Following the example, elements of vector 220 represent frequencies of distinct attribute values, and has a sum of 3. Vector 220 can be normalized by the sum of 3, such that the element at index 0 is updated to 0.33, and the element at index 7 to 0.67, so as to generate vector 230 as the provider feature, which has a sum of 1 as discussed above.

Example Process for Recipient Feature Generation

Figure 3:
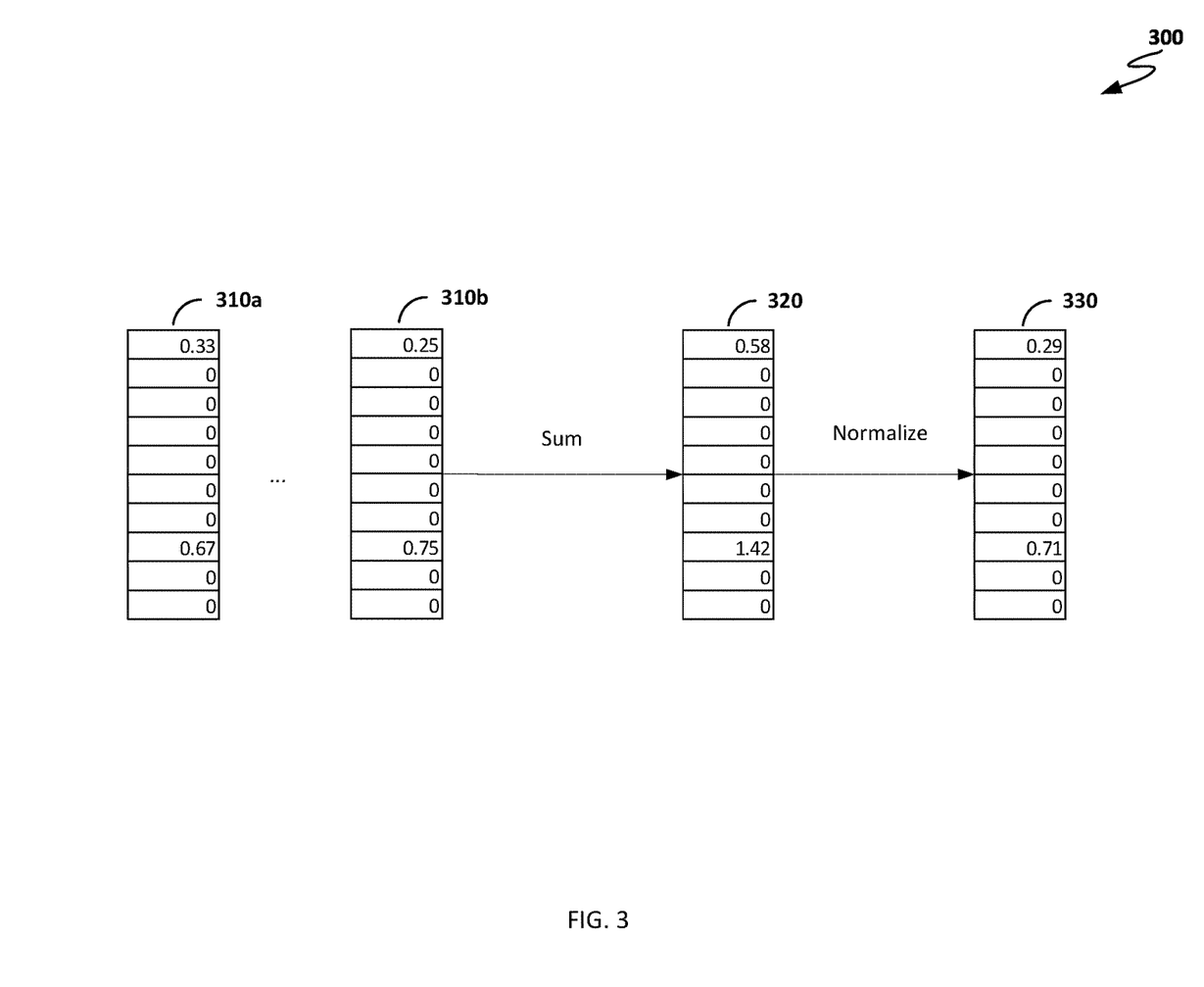
FIG. 3 depicts an example process for recipient feature generation for a unique recipient.

FIG. 3 depicts an example process 300 for recipient feature generation for a unique recipient. The recipient feature can be generated by recipient feature generator 126 as shown in FIG. 1. Process 300 can be carried out by a predictive system, such as predictive system 100 as shown in FIG. 1. Although FIG. 3 depicts provider features and recipient features as vectors, provider features and recipient features can be represented in other appropriate data structures, such as lists, dictionaries, a pandas DataFrames, or the like, whereas recipient features follow the format or data structure used to represent provider features. In addition, though the example illustrates vectors of a certain size, process 300 can generate vectors of variable sizes.

Process 300 can start by determining unique providers associated with the unique recipient in a transaction. Similar to provider feature generation discussed above in FIG. 2, in this example, one unique provider will contribute its provider feature only once, even if the unique provider recipient is associated with the unique recipient in multiple transaction.

Following the example, provider features of the associated unique providers can be obtained (e.g., from memory). In this example, the unique recipient is associated with 2 unique providers, whose provider features are illustrated as vector 310*a* and vector 310*b*. Vectors 310*a-b* are examples of provider feature vector 230 as shown in FIG. 2.

Process 300 can compute a sum of the provider features. In this example, a sum of the vectors 310*a-b* is computed to be vector 320. For example, vector 320 can be obtained by elementwise addition of vectors 310*a-b*, as illustrated. As illustrated, the element at index 0 of vector 310*a* (e.g., 0.33) is added to the element at index 0 of vector 310*b* (0.25), such that the element at index 0 (e.g., 0.33+0.25=0.58) of vector 320 is the sum of the two elements. Similarly, the element at index 7 of vector 310*a* (e.g., 0.67) is added to the element at index 7 of vector 310*b* (0.75), such that the element at index 7 (e.g., 0.67+0.75=1.42) of vector 320 is the sum of the two elements.

Process 300 can normalize the sum of the provider features to generate the recipient feature. In this example, vector 320 can be normalized based on the sum of vector 320. Normalized vector 320 is vector 330 as the recipient feature. As illustrated, the sum of vector 320 is 0.58+1.42=2. The element at index 0 of vector 320 is divided by the sum of vector 320 to generate the element at index 0 of vector 330, such that the element at index 0 of vector 330 is 0.58/2=0.29. Similarly, the element at index 7 of vector 330 is generated by dividing the element at index 7 of vector 320 (e.g., 1.42) by the sum of vector 320, such that the element at index 7 is 1.42/2=0.71. Vector 330 has a sum of 1, as discussed above.

In some examples, additionally, vector 330 is combined with (e.g., appended with) additional information about characteristics of the unique recipient, as discussed above. The characteristics of the unique recipient can include a number of invoices, an average transaction amount of the invoices, and/or the like.

Example Operations for Predicting Attributes for Recipients

Figure 4:
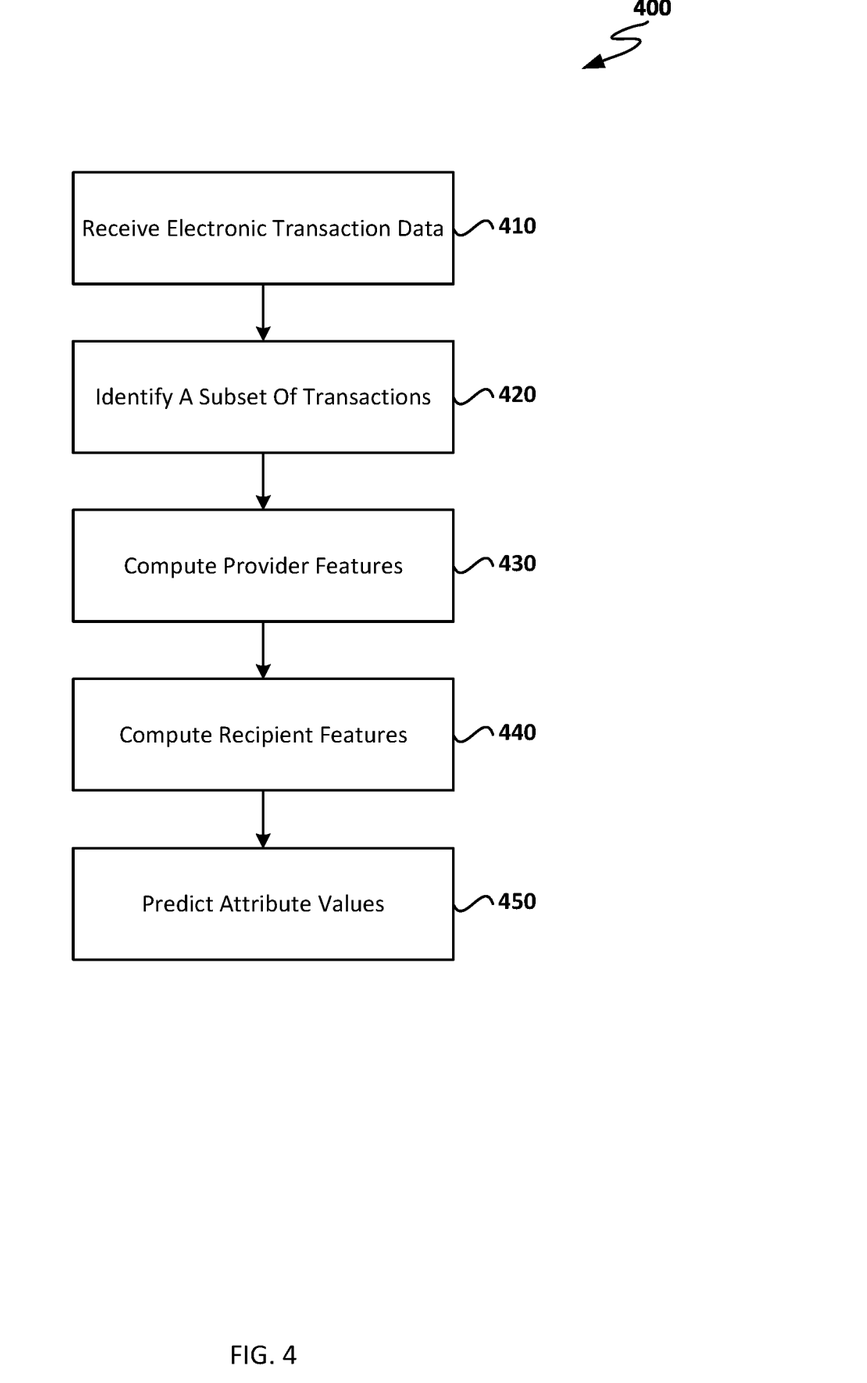
FIG. 4 is a flow diagram of example operations for predicting attributes for recipients.

FIG. 4 is a flow diagram of example operations 400 for predicting attributes for recipients. Operations 400 may be performed by a predictive system, such as predictive system 100 as illustrated in FIG. 1.

Operations 400 begin at 410, where electronic transaction data indicative of one or more transactions is received, wherein the one or more transactions are associated with one or more unique providers, and wherein each transaction of the one or more transactions indicates a recipient and one unique provider. For example, the electronic transaction data can be input data 110 as illustrated in FIG. 1.

At 420, a subset of transactions that are associated with known values for an attribute with respect to one or more unique recipients is identified from the one or more transactions, and wherein each transaction of the subset of transactions indicates one unique provider and one unique recipient. For example, the subset of transactions can be labeled data 112*a* as illustrated in FIG. 1.

At 430, a provider feature is computed for each unique provider of the one or more unique providers, based on the known values for the attribute with respect to a subset of the one or more unique recipients associated with the unique provider in the subset of transactions. For example, the provider feature can be compute by provider feature generator 124 as shown in FIG. 1. In some embodiments, to compute the provider feature, one or more distinct attribute values are identified in the subset of the known values for the attribute, as discussed with respect to vector 210 in FIG. 2, frequencies of the one or more distinct attribute values in the subset of the known values for the attribute are determined for the unique provider, as discussed with respect to vector 220 in FIG. 2, and the frequencies of the one or more distinct attribute values are normalized for the unique provider, based on a sum of the frequencies, as discussed with respect to vector 230 in FIG. 2.

At 440, a recipient feature is computed for a given recipient indicated in one or more given transactions of the one or more transactions that are not included in the subset of transactions, based on the provider feature of each unique provider of the one or more unique providers that is indicated in the one or more given transactions. For example, the one or more given transactions of the one or more transactions that are not included in the subset of transactions can be in unlabeled data 122*b* as shown in FIG. 1, and the recipient feature can be compute by recipient feature generator 126 as shown in FIG. 1. An example provider feature of each unique provider of the one or more unique providers can be vector 310*a* or vector 310*b* as shown in FIG. 3. In some embodiments, to compute the recipient feature, a sum of provider features of each unique provider of the one or more unique providers that is indicated in the one or more given transactions is calculated, as discussed respect to vector 320 in FIG. 3 and the sum of provider features is normalized based on a sum of components of the sum of provider features, as discussed respect to vector 330 in FIG. 3. In some embodiments, information about characteristics of the given recipient is received, and the recipient feature is combined with the characteristics of the given recipient.

At 450, a value for the attribute with respect to the given recipient is predicted, based on the recipient feature. For example, the value for the attribute can be predicted recipient attribute value 130 as shown in FIG. 1. In some embodiments, a respective recipient feature based on the provider feature of each unique provider of the one or more unique providers that is associated with the unique recipient in the subset of transactions is computed for each unique recipient of the one or more unique recipients, as discussed with respect to generating recipient features for a unique recipient in labeled data 112*a* in FIG. 1, and a machine learning model is trained based on the respective recipient feature for each unique recipient of the one or more unique recipients and the known values for the attribute with respect to the one or more unique recipients as discussed with respect to training predictor 128 in FIG. 1. In some embodiments, predicting the value for the attribute with respect to the given recipient is further based on the machine learning model, as discussed with respect to predictor 128 in FIG. 1. In some embodiments, the machine learning model comprises one or more of a logistic regression model, a random forest model, a decision tree, a gradient-boosted tree, or a neural network.

Example Application Server

Figure 5:
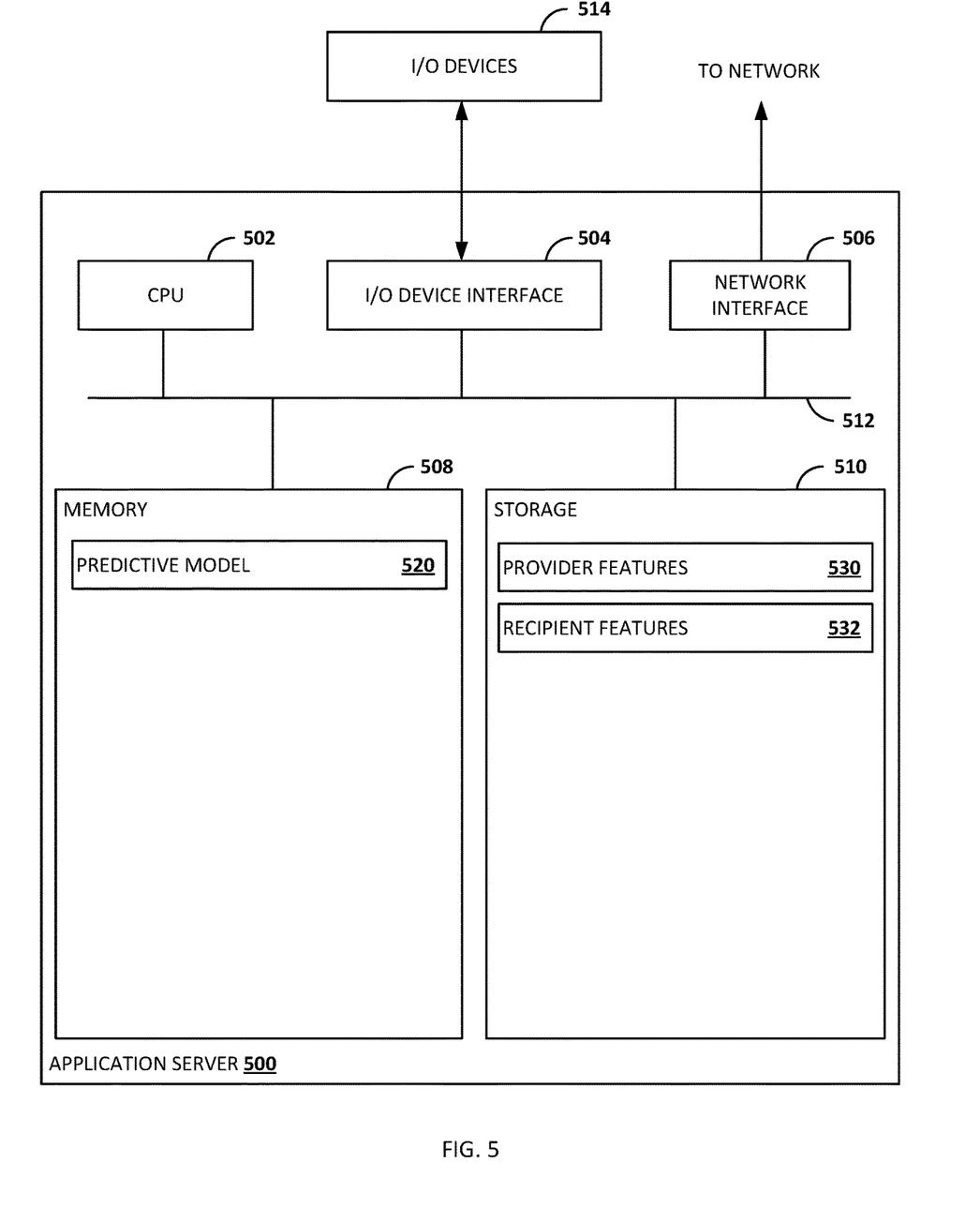
FIG. 5 depicts an example application server related to embodiments of the present disclosure.

FIG. 5 depicts an example application server 500, which can be used to deploy predictive system 100 of FIG. 1. As shown, application server 500 includes a central processing unit (CPU) 502, one or more input/output (I/O) device interfaces 504, which may allow for the connection of various I/O devices 514 (e.g., keyboards, displays, mouse devices, pen input, etc.) to application server 500, a network interface 506, a memory 508, a storage 510, and an interconnect 512.

CPU 502 may retrieve and execute programming instructions stored in memory 508. Similarly, CPU 502 may retrieve and store application data residing in memory 508. Interconnect 512 transmits programming instructions and application data, among CPU 502, I/O device interface 504, network interface 506, memory 508, and storage 510. CPU 502 is included to be representative of a single CPU, multiple CPUs, a single CPU having multiple processing cores, and the like. I/O device interface 504 may provide an interface for capturing data from one or more input devices integrated into or connected to application server 500, such as keyboards, mice, touchscreens, and so on. Memory 508 may represent a random access memory (RAM), while storage 510 may be a solid state drive, for example. Although shown as a single unit, storage 510 may be a combination of fixed and/or removable storage devices, such as fixed drives, removable memory cards, network attached storage (NAS), or cloud-based storage. In some embodiments, storage 510 is an example of database 130 of FIG. 1.

As shown, memory 508 includes predictive system 520. Predictive system 520 may be the same as or substantially similar to predictive system 100 of FIG. 1.

As shown, storage 510 includes provider features 530 and recipient feature 532. Provider features 530 and recipient feature 532 may be the same as or substantially similar to vector 230 of FIG. 2 and vector 330 of FIG. 3, respectively.

It is noted that the components depicted in application server 500 are included as examples, and other types of computing components may be used to implement techniques described herein. For example, while memory 508 and storage 510 are depicted separately, components depicted within memory 508 and storage 510 may be stored in the same storage device or different storage devices associated with one or more computing devices.

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but are to be accorded the full scope consistent with the language of the claims.

Within a claim, reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

What is claimed is:

1. A method, comprising:
   receiving, by one or more processors, electronic transaction data indicative of one or more transactions, wherein the one or more transactions are associated with one or more unique providers, and wherein each transaction of the one or more transactions indicates a recipient and one unique provider;
   identifying, by the one or more processors and from the one or more transactions, a subset of transactions that are associated with known values for an attribute with respect to one or more unique recipients, and wherein each transaction of the subset of transactions indicates one unique provider and one unique recipient;
   computing, by the one or more processors and for each unique provider of the one or more unique providers, a provider feature based on the known values for the attribute with respect to a subset of the one or more unique recipients associated with the unique provider in the subset of transactions;
   computing, by the one or more processors and for a given recipient indicated in one or more given transactions of the one or more transactions that are not included in the subset of transactions, a recipient feature based on the provider feature of each unique provider of the one or more unique providers that is indicated in the one or more given transactions, the computing the recipient feature comprising:

combining the provider features of each unique provider of the one or more unique providers that is indicated in the one or more given transactions to generate a combined provider feature, and normalizing the combined provider feature based on a sum of components of the combined provider feature; and predicting, by the one or more processors, based on the recipient feature and via a machine learning model, a value for the attribute with respect to the given recipient.

2. The method of claim 1, wherein computing, for each unique provider of the one or more unique providers, the provider feature based on the known values for the attribute with respect to the subset of the one or more unique recipients associated with the unique provider in the subset of transactions comprises:

identifying one or more distinct attribute values in the subset of the known values for the attribute;

determining, for the unique provider, frequencies of the one or more distinct attribute values in the subset of the known values for the attribute; and normalizing, for the unique provider, the frequencies of the one or more distinct attribute values based on a sum of the frequencies.

3. The method of claim 1, wherein combining the provider features of each unique provider of the one or more unique providers that is indicated in the one or more given transactions to generate the combined provider feature comprises calculating a sum of provider features of each unique provider of the one or more unique providers that is indicated in the one or more given transactions.

4. The method of claim 3, further comprising:

receiving information about characteristics of the given recipient; and combining the recipient feature with the characteristics of the given recipient.

5. The method of claim 1, further comprising:

computing, for each unique recipient of the one or more unique recipients, a respective recipient feature based on the provider feature of each unique provider of the one or more unique providers that is associated with the unique recipient in the subset of transactions; and training the machine learning model based on the respective recipient feature for each unique recipient of the one or more unique recipients and the known values for the attribute with respect to the one or more unique recipients.

6. The method of claim 1, wherein the machine learning model comprises one or more of a logistic regression model, a random forest model, a decision tree, a gradient-boosted tree, or a neural network.

7. A system, comprising:

a memory including computer-executable instructions; and one or more processors configured to execute the computer-executable instructions and cause the system to:

receive electronic transaction data indicative of one or more transactions, wherein the one or more transactions are associated with one or more unique providers, and wherein each transaction of the one or more transactions indicates a recipient and one unique provider;

identify, from the one or more transactions, a subset of transactions that are associated with known values for an attribute with respect to one or more unique recipients, and wherein each transaction of the subset of transactions indicates one unique provider and one unique recipient;

compute, for each unique provider of the one or more unique providers, a provider feature based on the known values for the attribute with respect to a subset of the one or more unique recipients associated with the unique provider in the subset of transactions;

compute, for a given recipient indicated in one or more given transactions of the one or more transactions that are not included in the subset of transactions, a recipient feature based on the provider feature of each unique provider of the one or more unique providers that is indicated in the one or more given transactions, the computing the recipient feature comprising:

combining the provider features of each unique provider of the one or more unique providers that is indicated in the one or more given transactions to generate a combined provider feature, and normalizing the combined provider feature based on a sum of components of the combined provider feature; and predict, by the one or more processors, based on the recipient feature and via a machine learning model, a value for the attribute with respect to the given recipient.

8. The system of claim 7, wherein computing, for each unique provider of the one or more unique providers, the provider feature based on the known values for the attribute with respect to the subset of the one or more unique recipients associated with the unique provider in the subset of transactions comprises:

identifying one or more distinct attribute values in the subset of the known values for the attribute;

determining, for the unique provider, frequencies of the one or more distinct attribute values in the subset of the known values for the attribute; and normalizing, for the unique provider, the frequencies of the one or more distinct attribute values based on a sum of the frequencies.

9. The system of claim 7, wherein combining the provider features of each unique provider of the one or more unique providers that is indicated in the one or more given transactions to generate the combined provider feature comprises calculating a sum of provider features of each unique provider of the one or more unique providers that is indicated in the one or more given transactions.

10. The system of claim 9, wherein the one or more processors, when executing the computer-executable instructions, further causes the system to:

receive information about characteristics of the given recipient; and combine the recipient feature with the characteristics of the given recipient.

11. The system of claim 7, wherein the one or more processors, when executing the computer-executable instructions, further causes the system to:

compute, for each unique recipient of the one or more unique recipients, a respective recipient feature based on the provider feature of each unique provider of the one or more unique providers that is associated with the unique recipient in the subset of transactions; and train the machine learning model based on the respective recipient feature for each unique recipient of the one or more unique recipients and the known values for the attribute with respect to the one or more unique recipients.

12. The system of claim 7, wherein the machine learning model comprises one or more of a logistic regression model, a random forest model, a decision tree, a gradient-boosted tree, or a neural network.

13. A non-transitory computer readable medium comprising instructions to be executed in a computer system, wherein the instructions when executed in the computer system cause the computer system to:
- receive electronic transaction data indicative of one or more transactions, wherein the one or more transactions are associated with one or more unique providers, and wherein each transaction of the one or more transactions indicates a recipient and one unique provider;
- identify, from the one or more transactions, a subset of transactions that are associated with known values for an attribute with respect to one or more unique recipients, and wherein each transaction of the subset of transactions indicates one unique provider and one unique recipient;
- compute, for each unique provider of the one or more unique providers, a provider feature based on the known values for the attribute with respect to a subset of the one or more unique recipients associated with the unique provider in the subset of transactions;
- compute, for a given recipient indicated in one or more given transactions of the one or more transactions that are not included in the subset of transactions, a recipient feature based on the provider feature of each unique provider of the one or more unique providers that is indicated in the one or more given transactions, the computing the recipient feature comprising:
  - combining the provider features of each unique provider of the one or more unique providers that is indicated in the one or more given transactions to generate a combined provider feature, and
  - normalizing the combined provider feature based on a sum of components of the combined provider feature; and
- predict, based on the recipient feature and via a machine learning model, a value for the attribute with respect to the given recipient.

14. The non-transitory computer readable medium of claim 13, wherein computing, for each unique provider of the one or more unique providers, a provider feature based on the known values for the attribute with respect to the subset of the one or more unique recipients associated with the unique provider in the subset of transactions comprises:
- identifying one or more distinct attribute values in the subset of the known values for the attribute;
- determining, for the unique provider, frequencies of the one or more distinct attribute values in the subset of the known values for the attribute; and
- normalizing, for the unique provider, the frequencies of the one or more distinct attribute values based on a sum of the frequencies.

15. The non-transitory computer readable medium of claim 13, wherein combining the provider features of each unique provider of the one or more unique providers that is indicated in the one or more given transactions to generate the combined provider feature comprises calculating a sum of provider features of each unique provider of the one or more unique providers that is indicated in the one or more given transactions.

16. The non-transitory computer readable medium of claim 15, wherein the instructions when executed in the computer system further cause the computer system to:
- receive information about characteristics of the given recipient; and
- combine the recipient feature with the characteristics of the given recipient.

17. The non-transitory computer readable medium of claim 13, wherein the instructions when executed in the computer system further cause the computer system to:
- compute, for each unique recipient of the one or more unique recipients, a respective recipient feature based on the provider feature of each unique provider of the one or more unique providers that is associated with the unique recipient in the subset of transactions; and
- train the machine learning model based on the respective recipient feature for each unique recipient of the one or more unique recipients and the known values for the attribute with respect to the one or more unique recipients.

18. The non-transitory computer readable medium of claim 13, wherein the machine learning model comprises one or more of a logistic regression model, a random forest model, a decision tree, a gradient-boosted tree, or a neural network.

* * * * *